United States Patent Office 3,417,130
Patented Dec. 17, 1968

3,417,130
OLIGOMERIZATION
Roy L. Pruett, Charleston, and William R. Myers, St. Albans, W. Va., assignors to Union Carbide Corporation, a corporation of New York
No Drawing. Filed June 24, 1964, Ser. No. 377,481
7 Claims. (Cl. 260—485)

ABSTRACT OF THE DISCLOSURE

A process for oligomerizing a conjugated diene, alone or in conjunction with other ethylenically unsaturated compounds, which comprises contacting the conjugated diene with a di-indenyl nickel catalyst. The products produced by the process possess ethylenic unsaturation which represents functional moieties susceptible to additional reactions.

---

This invention relates to the reaction of dienes to form ethylenically unsaturated oligomers i.e., compounds formed from the interreaction of a few monomer units such as from 2 to 4 monomer units. More particularly, this invention involves the process of oligomerizing dienes, alone or with other ethylenically unsaturated compounds, in the presence of an organo nickel catalyst.

The process of this invention produces many useful compounds; such compounds possess ethylenic unsaturation which represent functional moieties susceptible to additional reactions such as epoxidation, carbonylation, free-radical addition polymerization, carbonylation followed by hydrogenation to form alcoholic hydroxyl groups, and the like reactions. The process of this invention is adaptable for the oligomerization of a wide variety of dienes, alone or in conjunction with other ethylenically unsaturated compounds, to form an unusually large number of different oligomers possessing useful properties.

The process of this invention involves the interreaction of dienes or the co-reaction of dienes with other ethylenically unsaturated compounds in the presence of a di-indenyl nickel. The reactive diene is an organic compound possessing at least two ethylenically unsaturated moieties (illustrated as $>C=C<$), preferably possessing at least two ethylenically unsaturated moieties (i.e., $>C=C<$) in conjugated position with respect to each other, i.e., have the following structure:

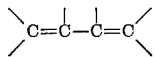

the free valences of which are bonded to either hydrogen or monovalent organic radicals free of acetylenic unsaturation.

For the purpose of this invention, the interreaction and co-reaction, as employed herein, are encompassed by the term "reaction"; an "oligomer" contains from two (2) to and including about four (4) joined monomer units; and "oligomerizing" is the process of forming the oligomers.

Particularly desirable dienes include those characterized by the following formula:

(I)   $R-\underset{R^1}{\overset{}{C}}=\underset{R^2}{\overset{}{C}}-\underset{R^3}{\overset{}{C}}=\underset{R^3}{\overset{}{C}}-R^5$ wherein R, $R^1$, $R^2$, $R^3$, $R^4$, and $R^5$ may be one of hydrogen, alkyl of from 1 to about 8 carbon atoms, cycloalkyl of from about 4 to about 8 carbon atoms, aryl, alkaryl (wherein the alkyl moiety can have from 1 to about 8 carbon atoms), aralkyl having from 7 to about 14 carbon atoms, alkoxy containing from 1 to about 8 carbon atoms, carboalkoxy (viz.

wherein $R^0$ is alkyl of from 1 to 8 carbon atoms), carboaryloxy, cyano, halogen (e.g., chlorine, fluorine, bromine, iodine), aldehyde (i.e.

hydrocarbylcarbonyl (i.e.,

wherein R" is alkyl of from 1 to about 8 carbon atoms, cycloalkyl as defined above or aryl), and the like radicals. Preferred are those dienes containing from 4 to about 12 carbon atoms, and most preferred is butadiene-1,3 and substituted butadienes-1,3 possessing from 4 to 8 carbon atoms.

Illustrative of the usable dienes include, by way of example, the following:

$CH_2=CH-CH=CH_2$, butadiene

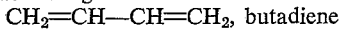
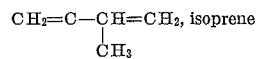

$CH_3CH=CH-CH=CH_2$ piperylene

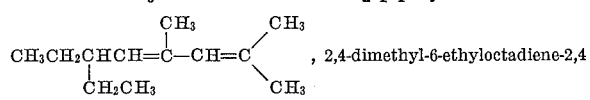, 2,4-dimethyl-6-ethyloctadiene-2,4

$CH_2=CH-CH=CS-C_6H_5$, 1-phenyl-butadiene-1,3

$C_6H_5-CH=CH-CH=CH-C_6H_5$, 1,4-diphenyl-butadiene-1,3

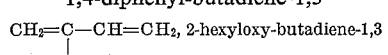 2-hexyloxy-butadiene-1,3

$CH_3OCH=CH-CH=CH_2$, 1-methoxybutadiene-1,3

$CH_3CH=CH-CH=CH-COOC_2H_5$, ethyl sorbate $CH_2=CH-CH=CH-COOC_6H_5$, phenyl penta-2,4-dienoate

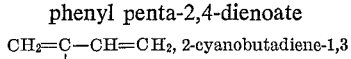 2-cyanobutadiene-1,3

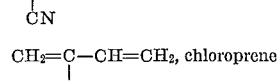 chloroprene $BrCH=CH-CH=CH_2$, 1-bromobutadiene-1,3

$CH_3CH=CH-CH=CHCHO$, sorbaldehyde

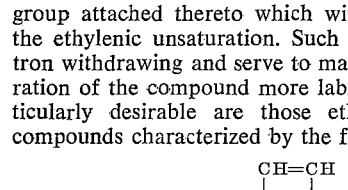 2,4-decadienone-6

Useful ethylenically unsaturated organic compounds co-reactable with the dienes include those possessing a group attached thereto which withdraws electrons from the ethylenic unsaturation. Such groups are called electron withdrawing and serve to make the ethylenic unsaturation of the compound more labile for co-reaction. Particularly desirable are those ethylenically unsaturated compounds characterized by the formula:

(II)   $\underset{X}{\overset{}{C}}H=\underset{Y}{\overset{}{C}}H$ wherein X is hydrogen or a radical possessing a negative para-sigma value as defined by Hammett (Physical Organic Chemistry, Published by McGraw-Hill Book Co., 1940, pp. 184–188) and Y is hydrogen or a radical possessing a positive para-sigma value as defined by Hammett, supra. As so defined, the para-sigma value of a substituent can be obtained from the equation:

para-sigma value $(\sigma) = \log K_i - \log K_i^\circ$ wherein $K_i$ designates the ionization constant of benzoic acid containing the substituent bonded in the para position and $K_i^\circ$ designates the ionization constant of benzoic acid per se.

In Formula II, when X is a radical possessing a negative para-sigma value, it is preferred that Y be a radical possessing a positive para-sigma value and when Y is hydrogen, X should also be hydrogen.

Illustrative examples of Y when it is a radical having a positive para-sigma value are e.g., the following: halide (i.e., chloride, fluoride, bromide, iodide), phenyl ($-C_6H_5$), $-CN$, $-COOH$, $-COOR^6$, $-CHO$, $-HO_2$, $CONH_2$, $-CONR_2^6$, $-OCOR^6$, and $-SOOR^6$, wherein $R^6$ may be alkyl of from 1 to about 18 carbon atoms, alkoxyalkyl of from 1 to about 18 carbon atoms, cyanoalkyl of from 1 to about 18 carbon atoms, or haloalkyl of from 1 to about 18 carbon atoms (and possessing from 1 to $2n+1$ halogen per radical, wherein $n$ is the number of carbon atoms of the radical and is an integer of from 1 to about 18). Illustrative of X when it is a radical possessing a negative para-sigma value are, e.g., the following: alkyl of from 1 to about 18 carbon atoms, hydroxyl, oxide, alkoxy of from 1 to about 18 carbon atoms, amino, and the like.

As typical of the ethylenically unsaturated monomers which can be polymerized in accordance with the process of this invention there can be mentioned the following: ethylene; acrylyl and alkylacrylyl compounds, particularly acrylic, haloacrylic and methacrylic acids and esters, and acrylyl and alkylacrylyl nitriles and amides, such as alpha-chloroacrylic acid, ethyl acrylate, cyanoethyl acrylate, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, chloroethyl methacrylate, acrylonitrile, methacrylamide, acrylamide, N,N-diethylacrylamide, diethylaminopropyl acrylamide, N-methoxymethyl acrylamide, acrolein, methacrolein and the like; vinyl and vinylidene halides, such as vinyl chloride, vinyl fluoride, vinylidene chloride, vinylidene fluoride, 1-fluoro-1-chloroethylene and the like; haloethylenes, such as chlorotrifluoroethylene, 1,1-dichloro-2,2-difluoroethylene and the like; vinyl esters of alkyl or haloalkyl carboxylic acids, such as vinyl acetate, vinyl chloroacetate, vinyl propionate, vinyl trimethylacetate, vinyl hexanoate, vinyl laurate, vinyl stearate and the like; N-vinyl imides, such as N-vinylphthalimide, N-vinylsuccinimide and the like; N-vinyllactams, such as N-vinyl caprolactam, N-vinylbutyrolactam and the like; vinyl aryls, such as styrene, vinylnaphthalene and the like; other vinyl derivatives, such as methyl vinyl ketone, vinylpyridine, methyl vinyl sulfone and the like, etc. The ethylenically unsaturated monomers of this invention also include those compounds having a plurality of ethylenic double bonds which are isolated with respect to each other, such as divinyl succinate, divinyl adipate, divinyl benzene and the like. Also contemplated in this connection are compounds having one or more of the isolated ethylenic groups conjugated with a carboxylic group, such as vinyl acrylate, vinyl methacrylate, methacrylic anhydride, acrylic and substituted acrylic esters of polyhydric alcohols, such as ethylene glycol dimethacrylate, diethylene glycol dimethacrylate, triethylene glycol dimethacrylate, tetraethylene glycol dimethacrylate, diethylene glycol diacrylate, decamethylene glycol diacrylate, glyceryl triacrylate, polyethylene glycol dimethacrylates and the like. Of the ethylenically unsaturated monomers mentioned above, ethylene, the haloethylenes, the vinyl and vinylidene halides, the vinyl aryls, the acrylic, haloacrylic and methacrylic acids and esters, the acrylyl and methacrylyl nitriles and amides and the vinyl esters of alkyl and haloalkyl carboxylic acids represent preferred monomers.

The catalyst, as indicated previously, which causes the oligomerization of dienes as herein described, comprises divalent nickel bound to two indene groups. The indene may be alkyl substituted. Illustrative di-indene-nickel catalysts usable in the process of this invention include those characterized by the formula:

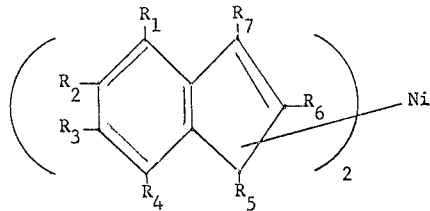

wherein $R_1$, $R_2$, $R_3$, $R_4$, $R_5$, $R_6$, and/or $R_7$ may be the same or different radicals, and may be hydrogen or alkyl groups having from about 1 to 4 carbon atoms. Illustrative alkyl groups are methyl, ethyl, propyl, isopropyl, n-butyl, sec.-butyl, and the like. Procedures for the manufacture of these di-indenyl-nickel catalysts are taught by Fischer, Z. Naturforsch. 8b, page 692 (1953).

The process of this invention involves the simple intermixture of the diene with or without another different ethylenically unsaturated organic reactant in the presence of the di-indenyl-nickel compound. The temperature of the reaction is not narrowly critical with temperatures of from about 0° C. up to about 200° C. representing operable limits. However, it has been found desirable to utilize temperatures of at least about 25° C. up to typically no greater than 175° C. Best results have been obtained at temperatures of at least 65° C. up to about 125° C. A most rapid reaction is obtained at temperatures varying between 85° C. and 110° C. The most desirable temperature is dependent upon the other conditions of reaction, viz. pressure, reactants, the design and size of reactor equipment, the particular catalyst selected, and the like.

The reaction is readily carried out in the absence of any solvents, although solvents may be used if desired. Suitable solvents are those which contain no groups which tend to destroy the activity of the catalyst. Usable solvents include both the aliphatic and aromatic hydrocarbons (such as toluene, xylene, benzene, hexane, heptane, octane, and the like), and the cyclic and acyclic ethers or esters. Typical of the latter class of solvents are dimethyl ether, diethyl ether, tetrahydrofurane, tetrahydropyran, dioxane, dimethyl ether of ethylene glycol, and the like type ethers. Useful esters include ethyl acetate, butyl acetate, methyl propionate, and the like. It is to be understood that the above list of operative solvents is not intended to be limited to those cited above. It is quite apparent that those skilled in the art will find other solvents which will be very useful in effecting the reactions described herein.

The instant process may be carried out at a variety of pressures ranging from subatmospheric pressures to superatmospheric pressures. When all of the reactants are liquid then pressures ranging from about .5 atmosphere to 150 atmospheres are usable. However, when at least one of the reactants is gaseous at the operative temperature of reaction, for example, ethylene, it is desirable to utilize superatmospheric pressure conditions. In such a case, pressures of from about 2 to 150 atmospheres are suitable. Most desirably, pressures in the range of from about 30 to 100 atmospheres have been found considerably workable when, for example, ethylene is a co-reactant.

The reaction may be achieved in periods of time ranging within minutes up to many hours depending upon the operative conditions of reaction. At the most desirable temperature ranges, reactions may be effected within periods of three hours. However, lower temperatures may require longer reaction times. Temperatures at about 65° C. may require reaction times in the order of about 10 to 15 hours. It is apparent that the pressure, temperature, the particular reactants, catalyst, and other factors will greatly determine the time of reaction.

The exact mechanism of the oligomerization reaction described herein is not wholly appreciated. However, it is believed that the unique bonding of the indenyl group to the Ni(II) contributes to the unique oligomers obtained. For example, it is believed that the particular oligomerization is controlled by pi-bonding of the unsaturated compound to the catalyst. This is somewhat borne out by the fact that the introduction of other ligands than the above reactants causes partial blocking of the coordinating sites of the catalyst and hence fewer ethylenic monomer (diene and mono-ene) can be coordinated with the catalyst resulting in oligomers built from lesser numbers of monomer units, say two units rather than four units. For example, the introduction of any triaryl phosphite ligand, such as tri-o-cresyl phosphite, tri-p-phenyl phosphite, phenyl di-p-cresyl phosphite, may be incorporated into the reaction of butadiene to cause formation of cyclooctatriene rather than cyclododecatriene which is obtained when the phosphite is essentially absent. Such aryl phosphites may be incorporated in the reaction in amounts ranging from about .5 to about 4 moles per mole of di-indenyl-nickel catalyst. Other ligands are employable for achieving similar novel process results.

The following examples serve to illustrate, but not limit, the above description of the invention.

EXAMPLE 1

A heavy-wall glass tube was charged with 8 milliliters of benzene, 30 milliliters of 1,3-butadiene and 1.2 grams of di-indenyl-nickel. The tube and contents were cooled in liquid nitrogen and the tube was then evacuated and sealed.

The tube was heated at 90° C. for 16 hours. At the end of this time the liquid contents had contracted to 80% of the original volume.

The tube was cooled, opened, and the contents distilled. Cyclododecatriene (17 grams) distilling at 71.5–72° C. and 7 millimeters Hg was obtained.

EXAMPLE 2

A heavy-wall glass tube was charged with 10 milliliters of benzene, 30 milliliters of 1,3-butadiene, 1.2 grams of di-indenyl-nickel and 5.2 grams of triphenyl phosphite. The tube was cooled in liquid nitrogen, evacuated, and sealed.

The tube and contents were heated at 84° C. for 12 hours. The contraction in volume was slight, which indicated a very slow reaction at this temperature. The temperature was raised to 110–120° C., and regulated in this range for six hours. This gave a 17% contraction in volume.

The tube and contents were cooled, the contents were removed and flash distilled at reduced pressure. A vapor phase chromatograph of the distillate showed that the butadiene had dimerized to a mixture of equal quantities of vinylcyclohexene and cyclooctadiene.

EXAMPLE 3

A three-liter autoclave was cooled in Dry Ice-acetone and charged, under a nitrogen atmosphere, with 600 milliliters of nitrogen-purged benzene, 240 milliliters of 1,3-butadiene and 6 grams of di-indenyl-nickel. The vessel was sealed and warmed. At 15–20° C. it was charged with 950 pounds per square inch of ethylene. The heating was continued while rocking the autoclave, and controlled in the range 95–100° C. for 2.5 hours.

The vessel was cooled to room temperature and vented of excess gases. The contents were flash distilled. Two fractions were obtained, the first distilling below room temperature and 1–2 millimeters of Hg, the second up to 80° C. at 1–2 millimeters of Hg. Thirteen grams of red residue remained. Fraction one was distilled through a short Vigreux column until nearly all the benzene was removed. The residue from this distillation was combined with fraction two and distilled through a spinning band column at reduced pressure.

The total weight of materials obtained corresponded to 80% conversion of the butadiene. A 57% yield (71.5% efficiency) of trans, normal-deca-1,4,9-triene distilled at 70–71° C. and 30 millimeters of Hg or 65–67° C. and 22 millimeters of Hg. A 14.5% yield (18% efficiency) of 1,5-cyclodecadiene distilled at 79–82° C. and 22 millimeters of Hg.

The decatriene and cyclodecadiene were identified by the nuclear magnetic resonance and infrared spectra.

EXAMPLE 4

Three-liter autoclave was cooled in Dry Ice-acetone and charged, under a nitrogen atmosphere, with 500 milliliters of tetrahydrofuran, 300 milliliters of 1,3-butadiene and 6.5 grams of di-indenyl-nickel. The vessel was sealed and warmed. At 15–20° C., it was charged with 900 pounds per square inch ethylene. While rocking, the vessel was heated at 95–100° C. for two hours.

After cooling to room temperature, the excess gases were vented and the contents (670 grams) of the vessel removed. This was flash distilled at reduced pressure and temperature up to 90° C. This gave 648 grams of distillate and 17 grams of red residue. The tetrahydrofuran was removed from the mixture by distillation through a Vigreux column from a hot water bath. After the solvent was removed, the higher-boiling material was fractionated through a spinning-band column. The yield of trans, normal-deca-1,4,9-triene was 52% (65% efficiency) and of cyclodeca-1,5-diene was 12% (15% efficiency).

EXAMPLE 5

Example 3 was repeated, with the exception that the reaction was conducted at 120–125° C. for 50 minutes. A vapor phase chromatogram of the volatile product indicated a product distribution of 76% decatriene and 11% cyclodecadiene.

EXAMPLE 6

A one-liter autoclave was cooled in Dry Ice-acetone and charged with 100 milliliters of benzene, 240 milliliters of 1,3-butadiene and 6 grams of di-indenyl-nickel. After sealing and warming to room temperature, the vessel was charged three times with 900 pounds per square inch ethylene. The vessel was rocked after each addition to allow absorption of the ethylene into the liquid phase. The rocker was started and the vessel and contents were heated at 70–75° C. for 13 hours.

The vessel was cooled to room temperature and opened. The contents (268 grams) were flash distilled at reduced pressure and less than 80° C. Vapor phase chromatographs of the volatile portion indicated the presence of 97 grams of deca-1,4,9-triene and 72 grams of cyclodecadiene.

EXAMPLE 7

A heavy-wall glass tube was charged with 10 milliliters of n-heptane, 13 milliliters of 1,3-butadiene, 15.6 grams of freshly-distilled styrene and 0.7 gram of di-indenyl-nickel. The tube was cooled in liquid nitrogen, evacuated, and sealed. After warming to room temperature, the tube was placed inside a heated pipe and maintained at 95° C. for 16 hours.

After cooling to room temperature, the tube was opened and the contents were removed. The reddish liquid was flashed-distilled up to a temperature of 95° C. at 1–2 milliliters of Hg pressure. The portion which volatilized under these conditions was shown to consist mainly of heptane and unreacted styrene, with traces of unreacted butadiene, vinylcyclohexene and 1,5-cyclooctadiene.

The residue (11 grams) was washed with dilute hydrochloric acid and then with water. This removed part of the metal catalyst but not all of it. The liquid was then distilled in a small molecular still. It distilled at 80–90° C. and 20–30 microns of Hg pressure. The molecular weight was determined to be 217 (calculated for 1 styrene, 2 butadiene: 212). The infrared spectrum confirmed the presence of unsaturation and a monosubstituted phenyl ring.

EXAMPLE 8

A 500-milliliter Parr pressure vessel was charged, under nitrogen, with 75 grams of freshly distilled ethyl acrylate, 81 grams of 1,3-butadiene and 4.1 grams of di-indenyl-nickel. The vessel was sealed and heated at 95° C. for 6 hours.

After cooling to room temperature, the unreacted butadiene was vented and then the vessel was pressurized with 500 pounds per square inch of hydrogen. At a temperature of 50–60° C., the hydrogen pressure was raised to 1200 pounds per square inch and the temperature to 80–90° C. Rapid absorption occurred. Hydrogen was added occasionally to repressurize when needed. A total of 2400 pounds per square inch of hydrogen was consumed.

The excess gases were vented and the vessel opened. A red liquid (134 grams) was removed and flash distilled up to a temperature of 95° C. This removed solvent and the hydrogenated Diels-Alder product, ethyl cyclohexane carboxylate. The residue was distilled through a spinning band column. At a pressure of 10–30 microns of Hg, 24.5 grams of clear, colorless liquid distilled at 130° C.

An infrared spectrum of this liquid showed strong ester bands. A portion was reduced to the corresponding alcohol by a standard lithium aluminum hydride reduction. From the semi-solid product was isolated a crystalline compound which melted at 82–85° C. The melting point for tetradecamethylenediol is 83–85° C. Elemental analyses, infrared and nuclear magnetic resonance spectra were further proof of this structure. Thus the original hydrogenated ester contained the diethyl ester of dodecamethylene dicarboxylic acid. The main portion was proved to be a branched-chain $C_{14}$ dibasic acid ester.

Though the above describes this invention by recourse to specific details, such are not intended to act to limit this invention unless recited in the claims.

What is claimed is:

1. A process for oligomerizing a conjugated diene of the formula

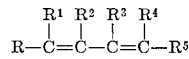

wherein R, $R^1$, $R^2$, $R^3$, $R^4$ and $R^5$ are selected from the group consisting of hydrogen and hydrocarbon radicals selected from the group of alkyl of from 1 to about 8 carbon atms, cycloalkyl of from about 4 to about 8 carbon atoms, aryl, alkaryl wherein the alkyl moiety has from 1 to about 8 carbon atoms, aralkyl having from 7 to about 14 carbon atoms, which comprises contacting such diene with di-indenyl nickel as catalyst so as to obtain an oligomer of said diene.

2. The process of claim 1 wherein oligomerization is performed in a solvent inert to the catalyst.

3. The process of claim 1 wherein oligomerization is carried out in the presence of triaryl phosphite.

4. The process of claim 1 wherein the conjugated diene is butadiene-1,3 and the catalyst is di-indenyl nickel (II).

5. The process of claim 1, which comprises oligomerizing said conjugated diene with another ethylenically unsaturated compound of the formula

wherein X is a member of the group consisting of hydrogen and a radical possessing a negative para-sigma value, Y is a member of the group consisting of hydrogen and a positive para-sigma value, by catalytically reacting said conjugated diene and said unsaturated compound in contact with di-indenyl nickel as catalyst to produce a co-oligomer of said conjugated diene and said unsaturated compound; said X radicals possessing a negative para-sigma value being alkyl from 1 to 18 carbon atoms, hydroxyl, oxirane oxide, alkoxy of from 1 to 18 carbon atoms and amino; and said Y radicals possessing a positive para-sigma value being halide, phenyl, nitrilo, carboxyl, amido and —$COOR^6$ wherein $R^6$ is alkyl of from 1 to 18 carbon atoms.

6. The process of claim 5 wherein the ethylenically unsaturated compound possesses an electron withdrawing group.

7. The process of claim 5 wherein the ethylenically unsaturated compound is ethyl acrylate.

References Cited

UNITED STATES PATENTS 3,721,468   9/1966   Wilke et al. _____ 260—266

OTHER REFERENCES

Wilke, Angew, Chem. Internation Ed., vol. 1, pp. 105–115, 1963.

LORRAINE A. WEINBERGER, *Primary Examiner.*

T. L. GALLOWAY, *Assistant Examiner.*

U.S. Cl. X.R.

260—614, 479, 601, 586, 593, 632, 348, 583, 654, 484, 533, 465.3, 561, 410.9, 486, 666, 683, 468, 239.3